(12) United States Patent
Hayase

(10) Patent No.: US 8,488,905 B2
(45) Date of Patent: Jul. 16, 2013

(54) IMAGE PROCESSING METHOD FOR REPRODUCING ONE IMAGE BY OVERLAPPING OUTPUT IMAGES BY FIRST AND SECOND DEVICES HAVING DIFFERENT OUTPUT MODES

(75) Inventor: Yosuke Hayase, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 912 days.

(21) Appl. No.: 12/579,918

(22) Filed: Oct. 15, 2009

(65) Prior Publication Data

US 2010/0104176 A1 Apr. 29, 2010

(30) Foreign Application Priority Data

Oct. 24, 2008 (JP) .................................. 2008-274870

(51) Int. Cl.
*G06K 9/36* (2006.01)
(52) U.S. Cl.
USPC ........... 382/276; 382/100; 382/254; 382/294; 382/325; 345/4; 345/5
(58) Field of Classification Search
USPC .......... 382/100, 254, 276, 294, 325; 345/629, 345/1.1, 1.3, 4–6, 204, 207, 693
See application file for complete search history.

(56) References Cited

U.S. PATENT DOCUMENTS

| | | | |
|---|---|---|---|
| 6,259,429 B1 * | 7/2001 | Gwynn | 345/589 |
| 6,542,634 B1 * | 4/2003 | Ohga | 382/167 |
| 7,129,456 B2 * | 10/2006 | Ioka et al. | 250/208.1 |
| 8,081,819 B2 * | 12/2011 | Ohga | 382/167 |
| 2006/0209213 A1 * | 9/2006 | Baker | 348/578 |
| 2008/0049044 A1 * | 2/2008 | Nitta | 345/634 |

FOREIGN PATENT DOCUMENTS

| | | |
|---|---|---|
| JP | 05-107639 | 4/1993 |
| JP | 2006-145863 | 6/2006 |
| JP | 2007-006039 A | 1/2007 |
| JP | 2008-122558 A | 5/2008 |

OTHER PUBLICATIONS

The above references were cited in a Aug. 20, 2012 Japanese Office Action, that issued in Japanese Patent Application No. 2008-274870.

* cited by examiner

*Primary Examiner* — Eric Rush
(74) *Attorney, Agent, or Firm* — Cowan, Liebowitz & Latman, P.C.

(57) ABSTRACT

It is difficult to reproduce an input image more faithfully while enlarging a dynamic range and color gamut, in a reproduced image obtained by overlapping output images by a projector and printer. An image processing apparatus (102) transforms an input signal (101) into an RGB signal for a projector (103) and a CMY signal for a printer (104). In this case, the image processing apparatus (102) uses a transformation LUT, which is generated based on the spectral distribution characteristics of the projector (103) and the spectral reflectivity characteristics of the printer (104). By overlapping images formed by the projector (103) and printer (104) based on the transformed image signals, an input image can be reproduced more faithfully while enlarging the dynamic range and color gamut.

16 Claims, 18 Drawing Sheets

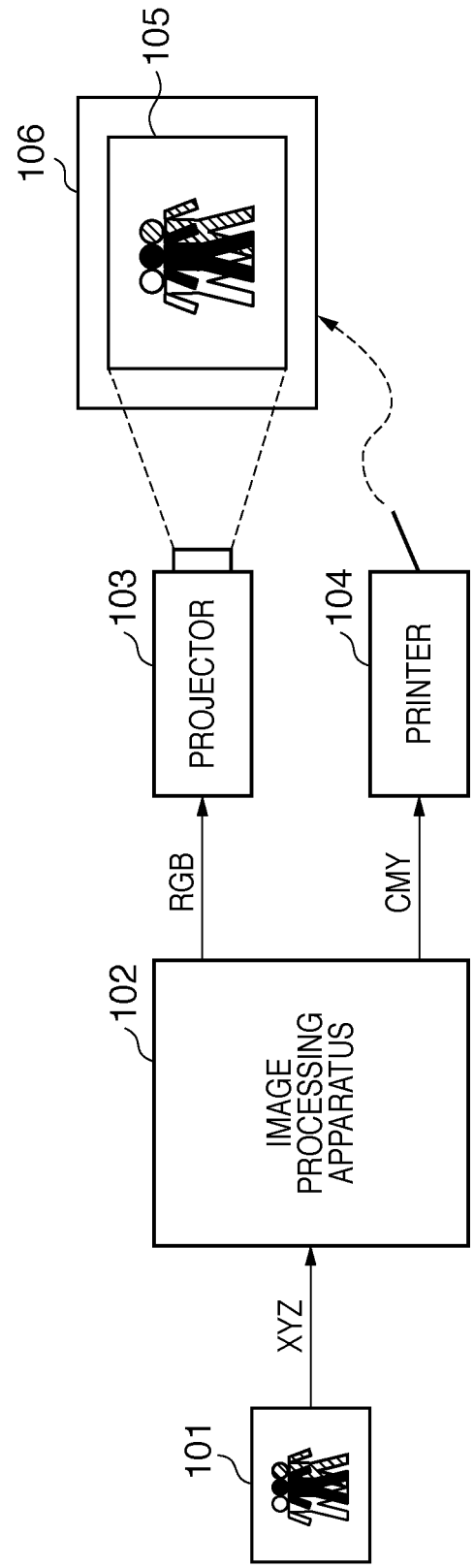

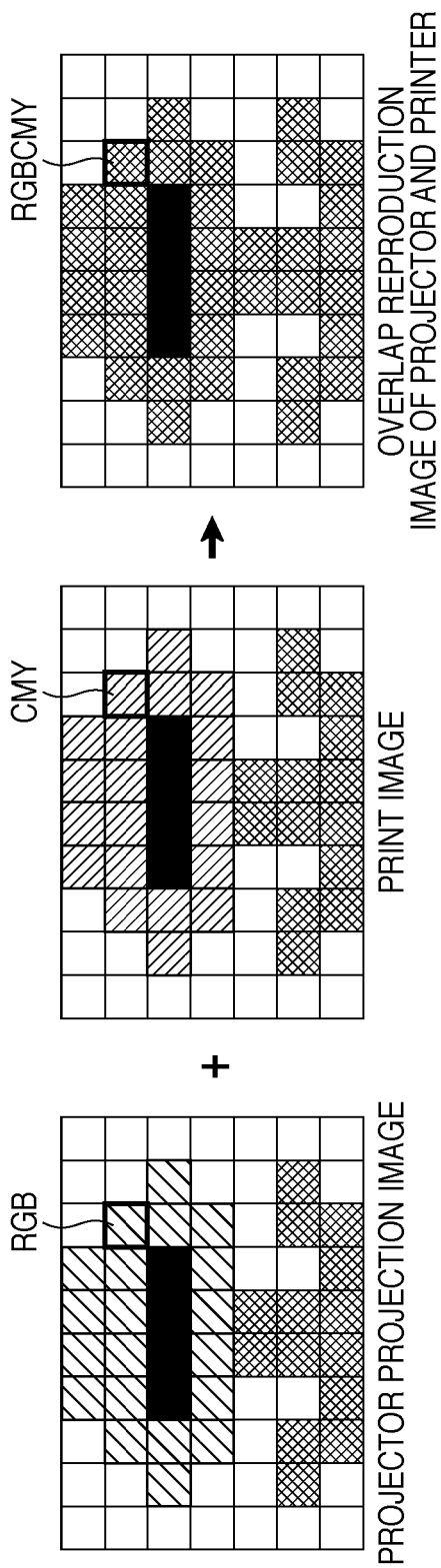

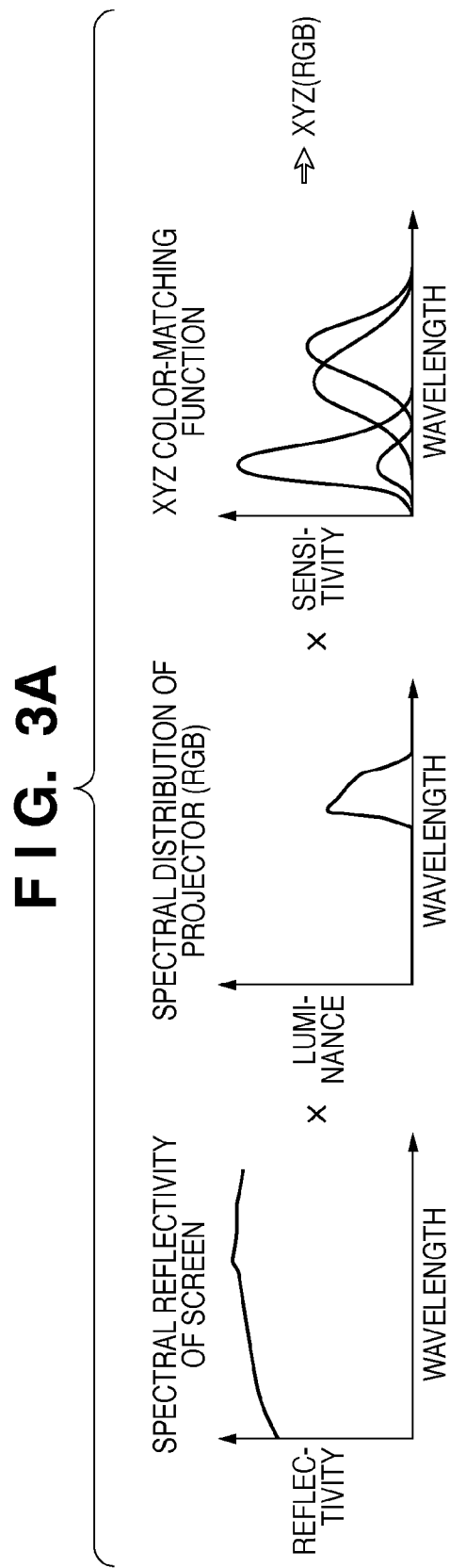

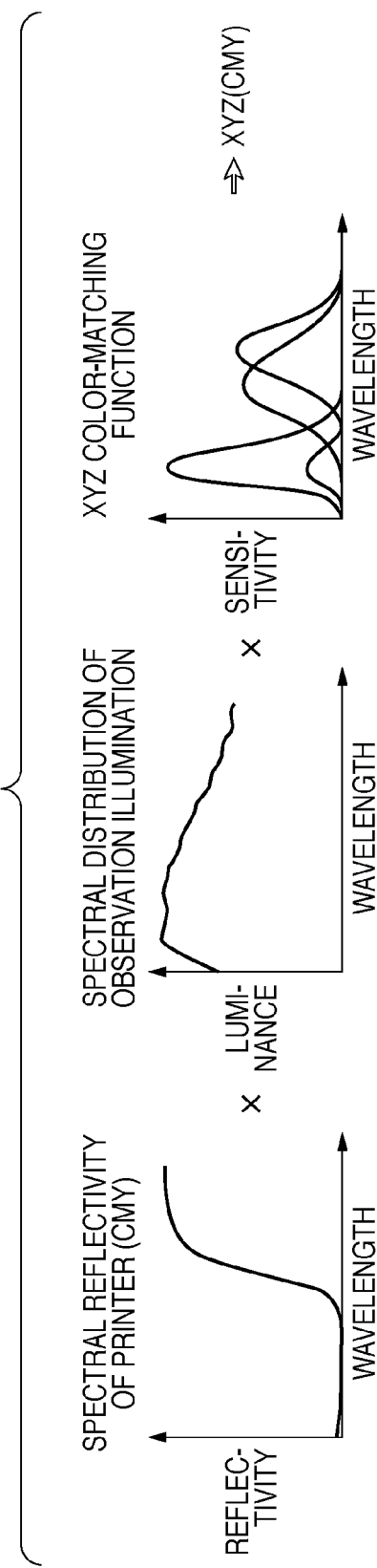

|  | WHITE LUMINANCE (cd / m²) | BLACK LUMINANCE (cd / m²) | CONTRAST RATIO |
|---|---|---|---|
| PROJECTOR ALONE (ILLUMINATION ILLUMINANCE : 0 lx) | 537.06 | 2.14 | 251 : 1 |
| PRINTER ALONE (ILLUMINATION ILLUMINANCE : 600 lx) | 55.97 | 0.25 | 224 : 1 |
| OVERLAP OF PROJECTOR AND PRINTER (ILLUMINATION ILLUMINANCE : 0 lx) | 537.06 | 0.0098 | 54802 : 1 |

IMAGE PROCESSING METHOD FOR REPRODUCING ONE IMAGE BY OVERLAPPING OUTPUT IMAGES BY FIRST AND SECOND DEVICES HAVING DIFFERENT OUTPUT MODES

BACKGROUND OF THE INVENTION

1. Field of the Invention

The present invention relates to image processing method, which reproduce one image by combining a plurality of devices.

2. Description of the Related Art

In recent years, the opportunities of handling high-dynamic range images (HDR images) having a high dynamic range in objects of the natural world sensed by a digital camera or the like, virtual objects modeled by computer graphics (CG), and the like, are increasing. It is demanded to reproduce such HDR image by a display device or an output device to be faithful to the human subjective vision. In this case, it is expected to use devices such as a projector which can display an image on a large screen and a large-size printer which can make a high-resolution, large-size output, since they can reproduce colors, tones, textures, and the like of real things (objects) and CG objects with a powerful size.

However, the dynamic ranges and color gamuts of these devices do not suffice to reproduce HDR images. For this reason, in order to reproduce HDR images using these devices, tone compression processing and color gamut compression processing called tone mapping have to be applied. Note that the dynamic ranges and color gamuts of the reproduction side devices are desirably as wide as possible so as to reproduce original colors and tones more faithfully.

In consideration of such aspects, since a projector has high white luminance while it projects a small amount of light even in black display, this causes a contrast ratio drop. Especially, since the black luminance rises as illumination is brighter, that is, a so-called black floating phenomenon is inevitable, the contrast ratio and reproduction color gamut are extremely reduced under illumination. Note that a projector is generally called a light-emitting type device since a projection image formed by self emission is detected by the user.

On the other hand, printed matter by a large-size printer does not suffer any serious black floating unlike a projector. However, since this printed matter is a reflecting object, a luminance more than illumination light cannot be obtained, and a sufficient dynamic range cannot be obtained. Note that a printer is generally called a reflection type device since an image is detected by the user based on reflected light of illumination by an image formed on a medium.

To cope with the aforementioned limitations on the luminance and color gamut, attempts have been made to enlarge the luminance and color gamut by stack projection that stacks and displays projection images by a plurality of projectors rather than a single projector (for example, see Japanese Patent Laid-Open Nos. 5-107639 and 2006-145863).

SUMMARY OF THE INVENTION

However, with the conventional stack projection system, although the white luminance can be raised, the black luminance also rises, and an improvement of a contrast ratio cannot be expected. Since a black floating phenomenon still occurs under a lighting environment, problems of reductions of the contrast ratio and color gamut remain unsolved.

According to one aspect of the present invention, there is provided an image processing method for reproducing one image by overlapping output images by first and second devices having different output modes, comprising: an input step of inputting an image signal to be reproduced; a device image generation step of generating, from the input image signal, a first image signal for the first device and a second image signal for the second device; and an output step of outputting the first image signal to the first device and the second image signal to the second device.

According to the present invention with the above arrangement, upon reproducing one image by overlapping output images by a plurality of devices having different output modes, the dynamic range and color gamut of the reproduced image can be enlarged to reproduce an input image more faithfully.

Further features of the present invention will become apparent from the following description of exemplary embodiments with reference to the attached drawings.

BRIEF DESCRIPTION OF THE DRAWINGS

FIG. 1 is a schematic block diagram showing an example of the arrangement of an image reproduction system according to an embodiment of the present invention;

FIG. 2 is a schematic view showing overlap reproduction of a projector projection image and print image according to the embodiment;

FIG. 3A is a view showing the concept of color reproduction by a projector alone according to this embodiment;

FIG. 3B is a view showing the concept of color reproduction by a printer alone according to this embodiment;

DESCRIPTION OF THE EMBODIMENTS

Figure 3C:
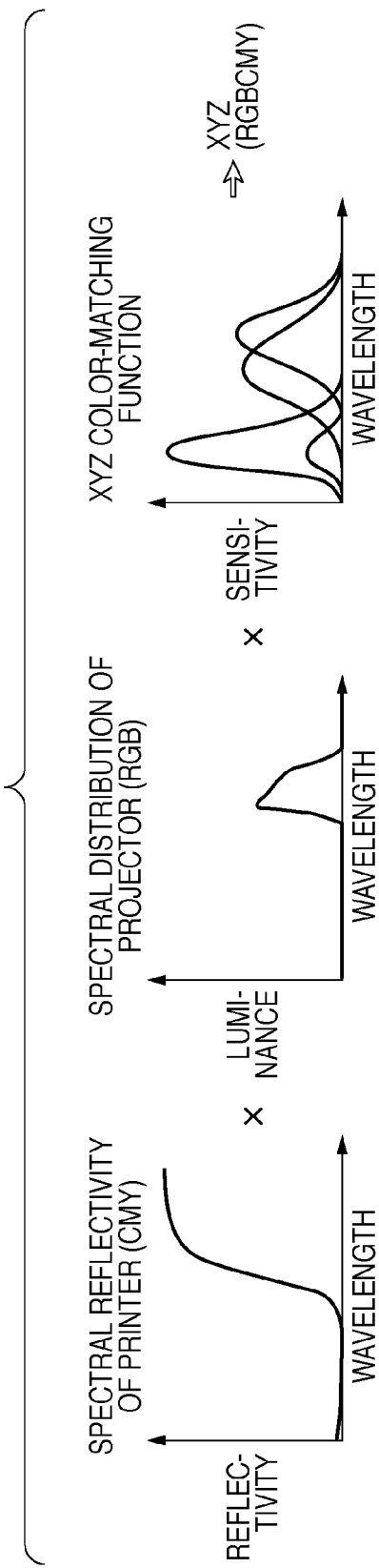
FIG. 3C is a view showing the concept of overlap color reproduction of the projector and printer according to the embodiment.

The present invention will be described in detail hereinafter by way of its preferred embodiments with reference to the accompanying drawings. Note that the arrangements illustrated in the following embodiments are merely examples, and the present invention is not limited to the illustrated arrangements.

First Embodiment

System Overview

FIG. 1 is a schematic block diagram showing the arrangement of an image processing system using an image processing apparatus of this embodiment. As shown in FIG. 1, this embodiment reproduces one image by overlapping output images by a plurality of devices (projector 103/printer 104) having different output modes. That is, an input image 101 is reproduced by a projector 103 as a first device and also by a printer 104 as a second image output device to overlap these reproduced images. As described in the related art, the projector 103 is called a light-emitting type device since a projection image formed by self emission is detected by the user. Also, the printer 104 is called a reflection type device since an image is detected by the user based on light of illumination reflected by an image formed on a medium.

The input image 101 is obtained by transforming color image data input by a digital camera, image scanner, or the like, or a graphic image generated on a computer such as a CG image into an XYZ signal in consideration of the property of an input device, lighting environment, and the like. When the XYZ signal of this input image 101 is input to an image processing apparatus 102, the image processing apparatus 102 transforms the input XYZ signal into a first image signal for a first device and a second image signal for a second device, and outputs the first and second image signals. That is, the image processing apparatus 102 serves as device image generation step, generates an RGB signal for the projector 103 and a CMY signal for the printer 104 from the input XYZ signal, and outputs these signals.

The RGB signal output from the image processing apparatus is input to the projector 103 to obtain a projector projection image 105. Also, the CMY signal is input to the printer 104 to obtain a print image 106. This print image 106 is adhered onto, for example, a wall, and the projector projection image 105 is projected in correspondence with the print area of the print image 106. Alternatively, when the projection geometric condition of the projector is determined in advance, the print size of the print image 106 is decided based on that condition to output the print image 106, and a projector projection area and print area are displayed in combination. At this time, when, for example, an outer frame, position alignment icons, and the like are given to the projector projection image 105 and print image 106 when these images are displayed and output, position and size adjustments can be facilitated.

As described above, according to this embodiment, the projector projection image 105 and print image 106 are overlapped each other by adjusting their position. As a result, as shown in, for example, FIG. 2, a reproduction image based on RGBCMY signals obtained by overlapping the RGB signal for the projector and the CMY signal for the printer for respective pixels can be obtained.

FIGS. 3A to 3C are schematic views respectively showing general color reproduction mechanisms in the case of a projector alone and a printer alone and an overlap color reproduction mechanism of a projector and printer, for the purpose of comparison.

FIG. 3A shows color reproduction in the case of a projector alone. When a screen on which a projector image is projected, and various other conditions are fixed, a display color XYZ (RGB) with respect to an arbitrary RGB signal of the projector is uniquely determined based on the spectral distribution of the projector and spectral reflectivity of the screen with respect to the RGB signal, and color-matching functions.

FIG. 3B shows color reproduction in the case of a printer alone. When a print medium, observation illumination, and various other conditions are fixed, a display color XYZ (CMY) with respect to an arbitrary CMY signal of the printer is uniquely determined based on the spectral reflectivity of the printer with respect to the CMY signal and spectral distribution of the observation illumination with respect to the CMY signal, and color-matching functions.

On the other hand, FIG. 3C represents color reproduction upon overlapping colors of a projector and printer. More specifically, a display color XYZ(RGBCMY) obtained by overlapping the RGB signal of the projector and the CMY signal of the printer is determined based on the spectral distribution of the projector with respect to the RGB signal, the spectral reflectivity of the printer with respect to the CMY signal, and color-matching functions. That is, this reveals that a plurality of colors can be expressed by combining a certain CMY signal with a plurality of RGB signals.

In this way, upon overlapping the colors of the projector and printer, various colors, which cannot be reproduced by a lone device, can be expressed by combining the RGB signal of the projector and the CMY signal of the printer, thus obtaining the enlargement effects of a dynamic range and color gamut.

Figures 4, 5:
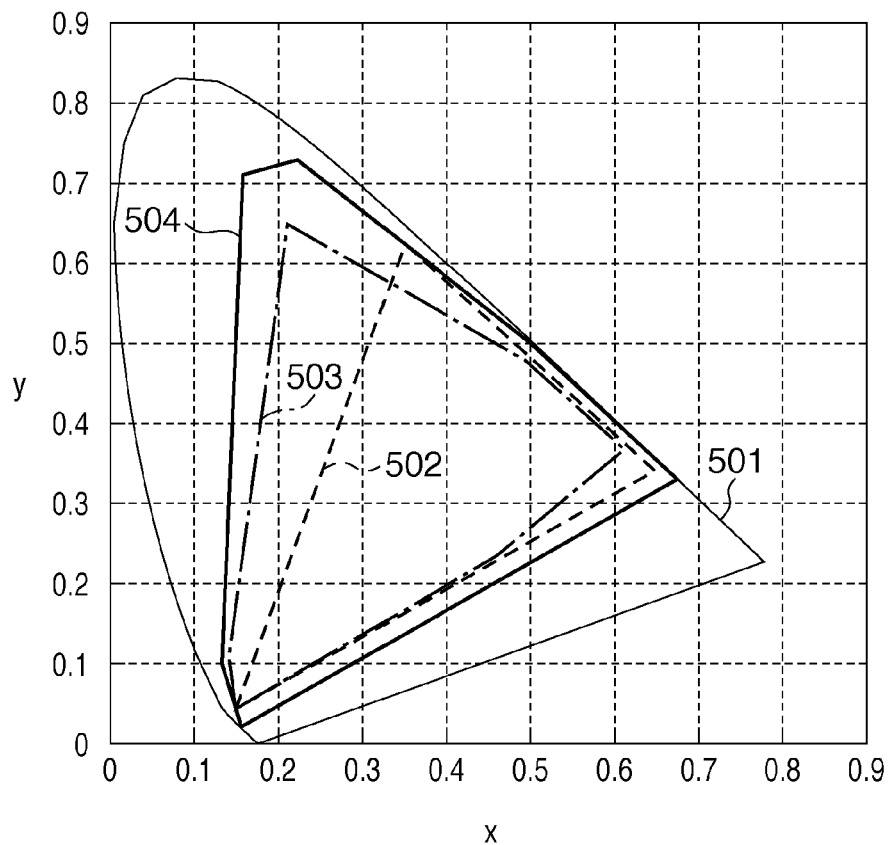
FIG. 4 is a table showing an enlargement effect of a dynamic range according to the embodiment.
FIG. 5 is a graph showing an enlargement effect of a color gamut according to the embodiment.

This embodiment enlarges the dynamic range and color gamut by overlapping the projector projection light and printer output. FIG. 4 shows the enlargement effect of the dynamic range, and FIG. 5 shows that of the color gamut.

As can be seen from FIG. 4, when the projector and printer outputs are overlapped, the black luminance level to be reproduced lowers and the contrast ratio is greatly raised compared to a projector alone. Then, since the reproduction color gamut of a dark part is also enlarged, reproducibility of dark colors can be improved. Compared to a printer alone, since the dynamic range is enlarged in both brightness directions, reproducibility in the brightness directions can be greatly improved.

FIG. 5 shows reproduction color gamuts on an x-y chromaticity diagram, that is, a visible area 501, a color gamut 502 of a projector alone, a color gamut 503 of a printer alone, and an overlap color gamut 504 of a projector and printer. As can be seen from FIG. 5, the overlap color gamut is apparently enlarged compared to a device alone, thus improving color reproducibility.

Apparatus Arrangement

Figure 6:
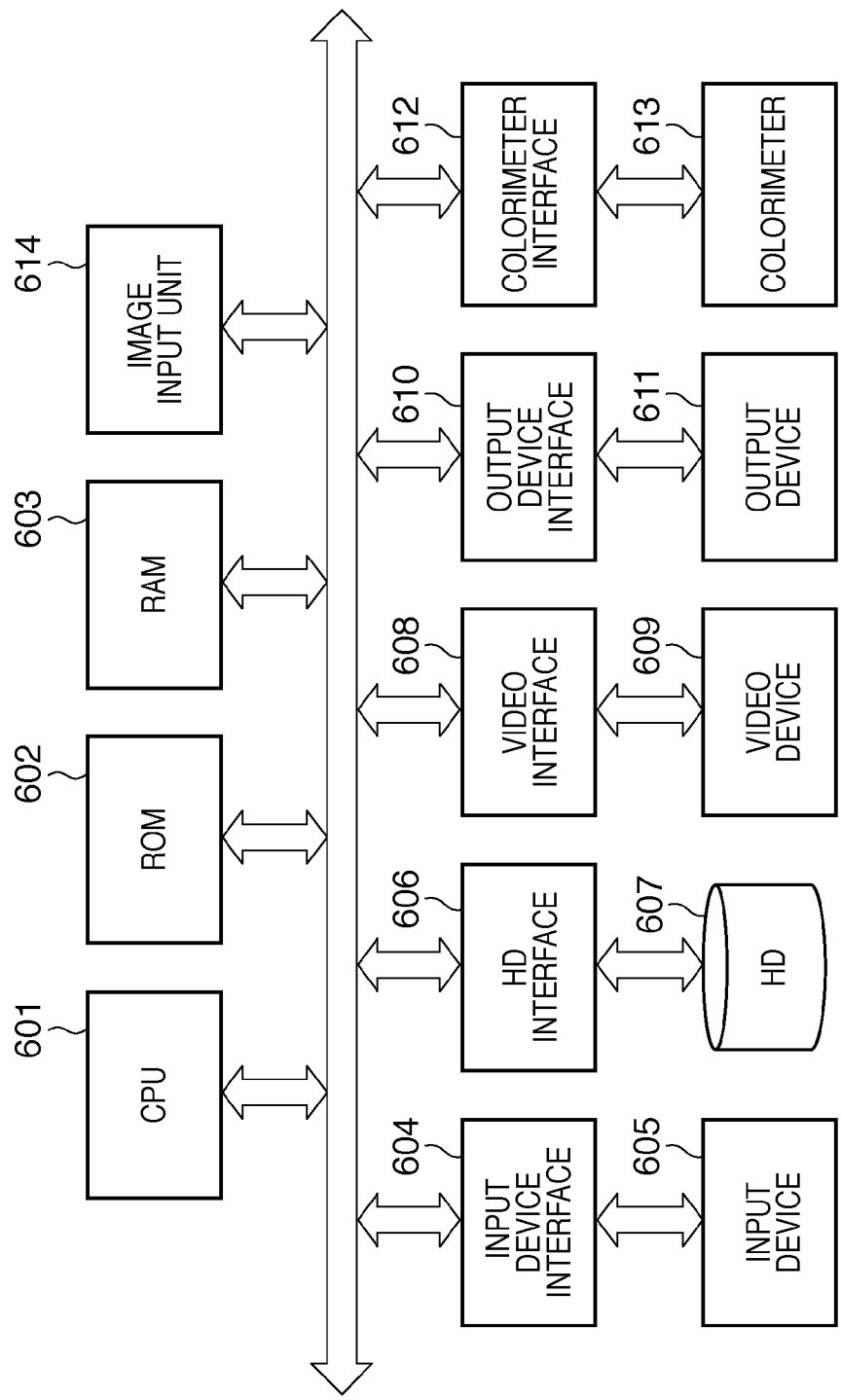
FIG. 6 is a block diagram showing an example of the arrangement of an image processing apparatus according to the embodiment.

FIG. 6 is a block diagram showing an example of the arrangement of the image processing apparatus 102 according to this embodiment. Referring to FIG. 6, a CPU 601 controls the operation of the overall apparatus according to programs stored in a ROM 602, hard disk (HD) 607, and the like. In this case, the CPU 601 executes various processes including image processing according to this embodiment using a RAM 603 as a work memory.

An input device interface 604 is an interface used to connect an input device 605. The input device 605 includes input devices such as a keyboard and mouse, and is used to input user instructions.

A hard disk interface 606 is an interface used to connect the HD 607, and a video interface 608 is an interface used to connect a video device 609. The video device 609 includes a display device such as a color monitor (e.g., a CRT and LCD) used to display an input image and a user interface screen according to the present invention, and the projector 103 used to display an image to which the image processing of this embodiment is applied.

An output device interface 610 is an interface used to connect an output device 611. The output device 611 includes an image output device such as the printer 104 (e.g., an ink-jet printer and electrophotographic printer) used to output a color image to which the image processing of this embodiment is applied.

A colorimeter interface 612 is an interface used to connect a colorimeter 613. The colorimeter 613 includes a measuring device used to measure the device properties of the video device 609 and output device 611, and a lighting environment. Note that this embodiment can be implemented by an arrangement which includes neither the colorimeter interface 612 nor the colorimeter 613. In this case, device property data and lighting environment data which are stored in advance in the ROM 602, RAM 603, or HD 607 may be used.

An image input unit 614 inputs image data to which the image processing of this embodiment is to be applied. However, this embodiment can be implemented by an arrangement which does not include any image input unit 614. In this case, image data, which is stored in advance in the ROM 602, RAM 603, or HD 607 may be used.

Note that the respective interfaces in this embodiment may use general-purpose interfaces. That is, for example, serial interfaces such as USB and IEEE1394, parallel interfaces such as SCSI and Centronics, and the like can be used as their usages.

Color Transformation Processing

Figure 7:
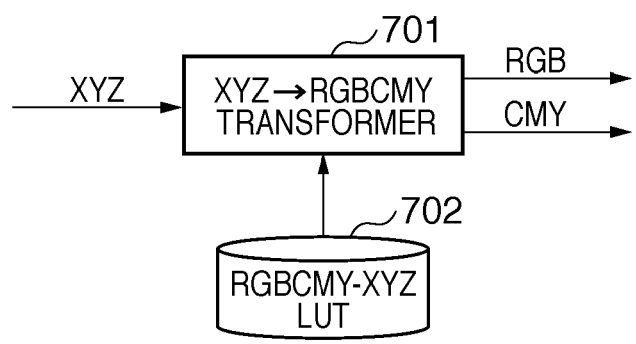
FIG. 7 is a block diagram showing an overview of color transformation processing in the image processing apparatus according to the embodiment.

The color transformation processing in the image processing apparatus 102 of this embodiment will be described below. FIG. 7 is a block diagram showing an overview of the color transformation processing of this embodiment. As shown in FIG. 7, an input XYZ signal is transformed into an RGB signal for the projector 103 and a CMY signal for the printer 104 by an XYZ→RGBCMY transformer 701 (to be simply referred to as a transformer 701 hereinafter). That is, the transformer 701 transforms the XYZ signal into RGBCMY signals by a known transformation method such as interpolation processing using an RGBCMY-XYZ transformation LUT 702 (to be simply referred to as an LUT 702 hereinafter) saved in the HD 607. This LUT 702 expresses, using XYZ values, the color reproduction property obtained upon overlapping colors defined by RGB values of the projector 103 and CMY values of the printer 104, and its creation method will be described later.

In this embodiment, upon overlapping and displaying the projector projection image and printer output image, since color transformation using the overlap color property is executed, reproduction faithful to actual appearance can be realized.

LUT Creation Processing

Figure 8:
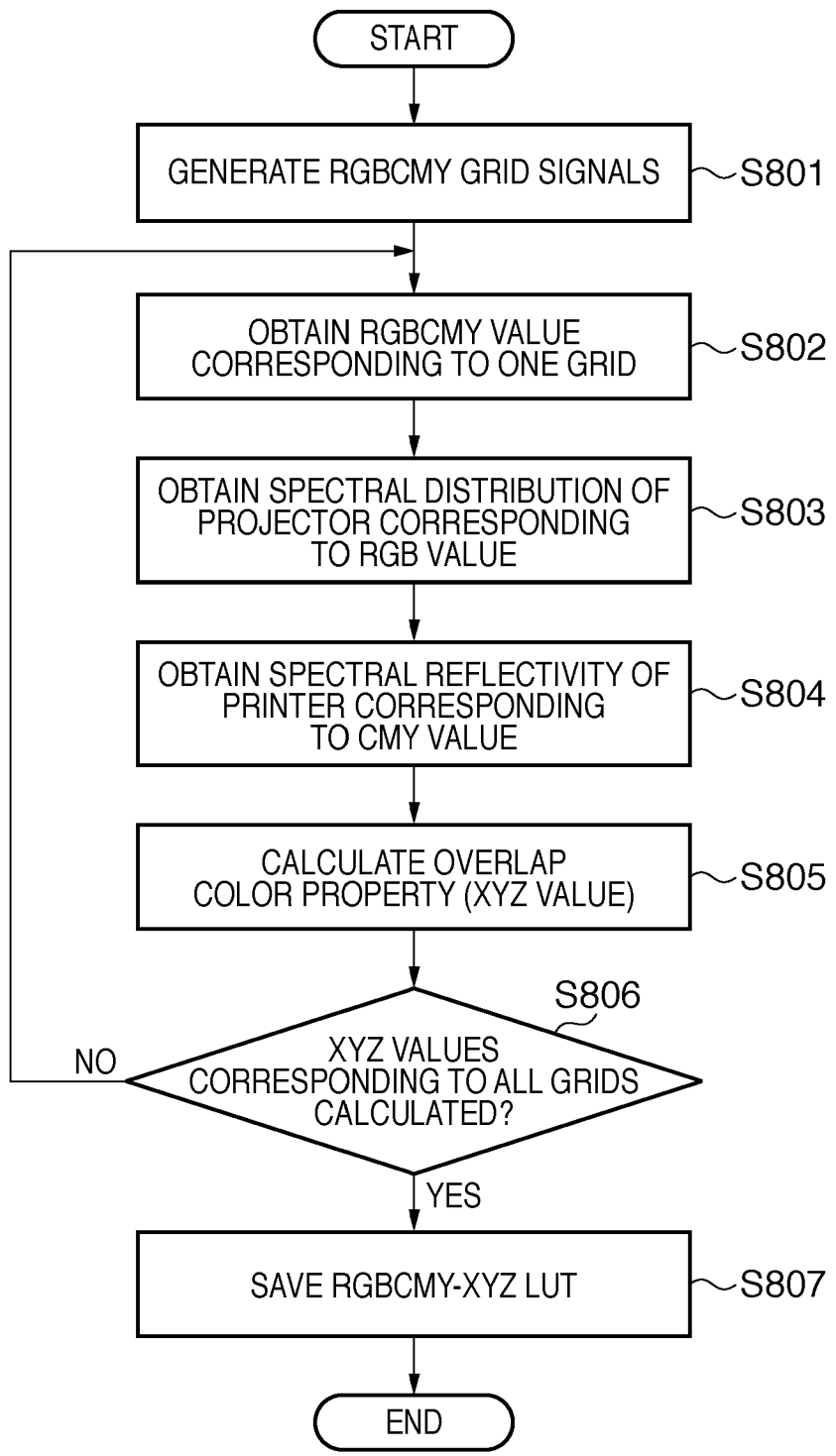
FIG. 8 is a flowchart showing the creation processing of an RGBCMY-XYZ LUT according to the embodiment.

FIG. 8 is a flowchart showing the creation processing of the LUT 702, which is referred to upon transforming an XYZ signal into RGBCMY signals in this embodiment.

In step S801, RGBCMY grid signals are generated. For example, RGBCMY grid values are generated to have five grids per color at equal intervals.

In step S802, RGBCMY values of one color, which corresponds to one grid of the grid signals generated in step S801, are obtained.

In step S803, the spectral distribution property of the projector 103, which corresponds to RGB values of interest of the RGBCMY values obtained in step S802, is obtained. The spectral distribution property of the projector 103 is already obtained by measuring the spectral distribution with respect to predetermined RGB values in advance, and is stored in the HD 607 as, for example, a spectral distribution profile. When the spectral distribution profile does not include RGB values that match the RGB values of interest, the spectral distribution property for the RGB values of interest is calculated by, for example, interpolation processing. Note that the obtaining method of the spectral distribution property of this embodiment is not particularly limited. For example, projection light of the projector with respect to predetermined RGB values may be directly measured. Also, the spectral distribution property may be calculated as follows. That is, the projector projects light onto a screen whose spectral reflectivity is given, the spectral distribution of reflected light from the screen is measured, and the spectral reflectivity value of the screen is divided by the measured spectral distribution.

In step S804, the spectral reflectivity property of the printer 104, which corresponds to CMY values of interest of the RGBCMY values obtained in step S802, is obtained. The spectral reflectivity property of the printer 104 is already obtained by, for example, measuring patches printed on a target medium based on predetermined CMY values in advance, and is stored in the HD 607 as, for example, a spectral reflectivity profile. When the spectral reflectivity profile does not include CMY values that match the CMY values of interest, the spectral reflectivity property for the CMY values of interest is calculated by, for example, interpolation processing.

In step S805, XYZ values as an overlap reproduction color upon overlapping a projection color based on the RGB values of interest of the projector 103 and a print color based on the CMY values of interest of the printer 104, which are obtained in step S802, are calculated based on:

$$X(r,g,b,c,m,y)=\int S_{prj}(r,g,b,\lambda)R_{prn}(c,m,y,\lambda)x(\lambda)d\lambda$$

$$Y(r,g,b,c,m,y)=\int S_{prj}(r,g,b,\lambda)R_{prn}(c,m,y,\lambda)y(\lambda)d\lambda$$

$$Z(r,g,b,c,m,y)=\int S_{prj}(r,g,b,\lambda)R_{prn}(c,m,y,\lambda)z(\lambda)d\lambda \quad (1)$$

where $X(r, g, b, c, m, y)$, $Y(r, g, b, c, m, y)$, and $Z(r, g, b, c, m, y)$ are respectively X, Y, and Z values corresponding to arbitrary RGBCMY values. Also, $S_{prj}(r, g, b, \lambda)$ is the spectral distribution of projector projection light corresponding to arbitrary RGB values, and $R_{prn}(c, m, y, \lambda)$ is the spectral reflectivity of a printed matter corresponding to arbitrary CMY values. Furthermore, $x(\lambda)$, $y(\lambda)$, and $z(\lambda)$ are XYZ color-matching functions of a 2° field, and $\lambda$ is the wavelength.

As can be seen from equations (1), the XYZ values as an overlap reproduction color of this embodiment are calculated based on the spectral distribution of the projector obtained in step S803 and the spectral reflectivity of the printer obtained in step S804.

It is then checked in step S806 if XYZ values for all the grid signals generated in step S801 are calculated. If the XYZ values for all the grid signals are calculated, the process advances to step S807; otherwise, the process returns to step S802 to execute processing for a grid signal whose XYZ values are not calculated yet.

Finally, in step S807, an LUT is created by associating the RGBCMY signals generated in step S801, and the XYZ signals calculated in step S805 with each other, and is saved in the HD 607, thus ending the processing. As described above, according to this embodiment, the LUT 702 is generated based on the overlap property of the projector and printer.

As described above, according to this embodiment, by overlapping the outputs from the projector as a light-emitting type device and the printer as a reflection type device, the dynamic range and color gamut can be enlarged compared to use of a device alone. In this case, since the color transformation processing is executed according to the overlap display property based on the spectroscopic properties of the projector and printer, an input image can be reproduced more faithfully.

Figure 17:
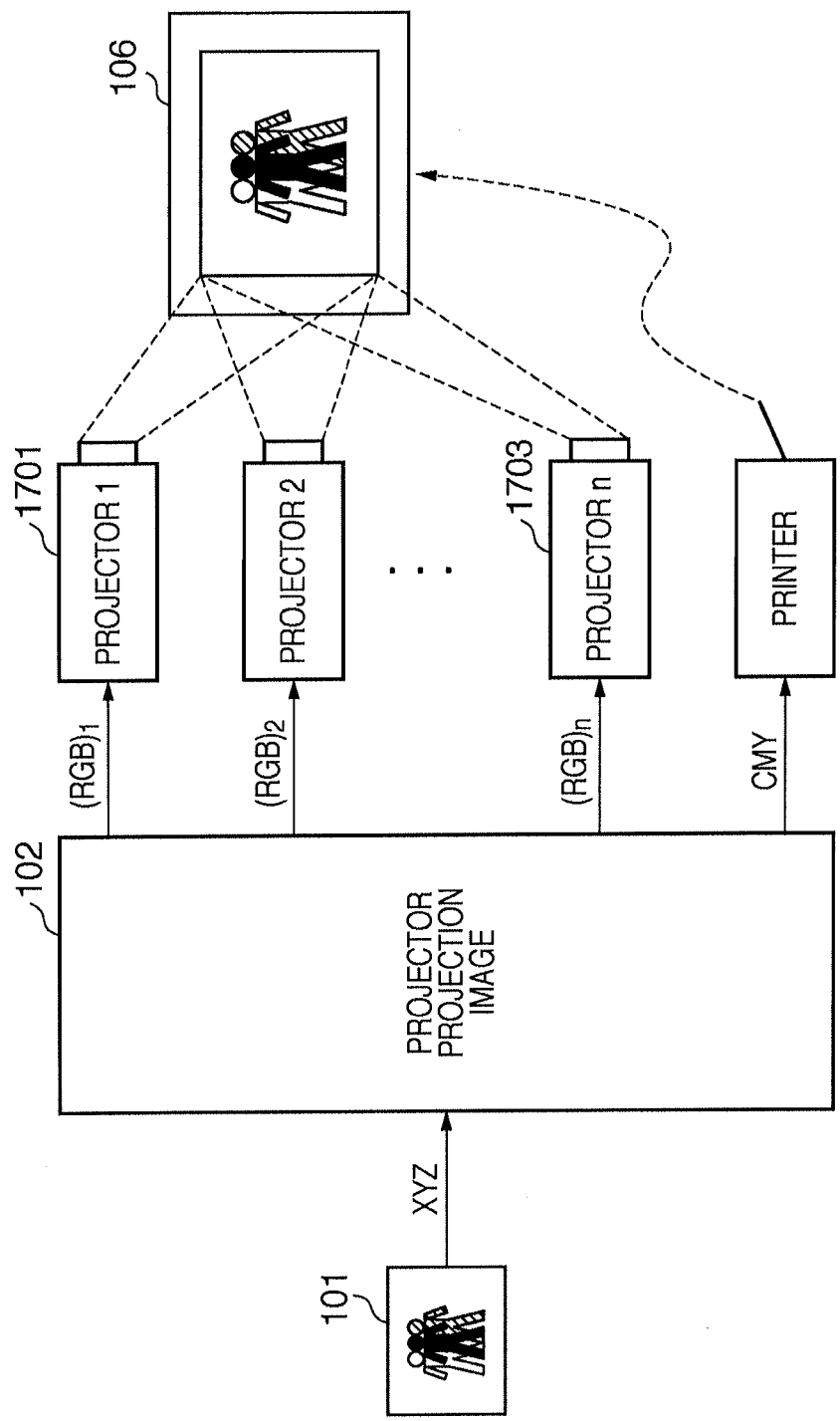
FIG. 17 is a schematic block diagram showing an example of the arrangement of an image reproduction system which attains overlap reproduction using a plurality of projectors according to the embodiment.

Note that this embodiment has explained the arrangement example using one projector and one printer. However, this embodiment can be applied to an arrangement using a plurality of projectors. FIG. 17 is a schematic block diagram of a system when overlap reproduction is implemented using n (n≧2) projectors and one printer. The overlap property in this case can be calculated based on one spectral distribution property obtained by adding those of respective projectors from a first projector 1701 to n-th projector 1703, and the spectral reflectivity of the printer. In this case, no problem is posed when the spectral distribution properties of the respective projectors are different.

Second Embodiment

The second embodiment according to the present invention will be described below. Note that in the second embodiment, only a difference from the first embodiment will be explained, and a redundant description will be avoided.

Figure 9:
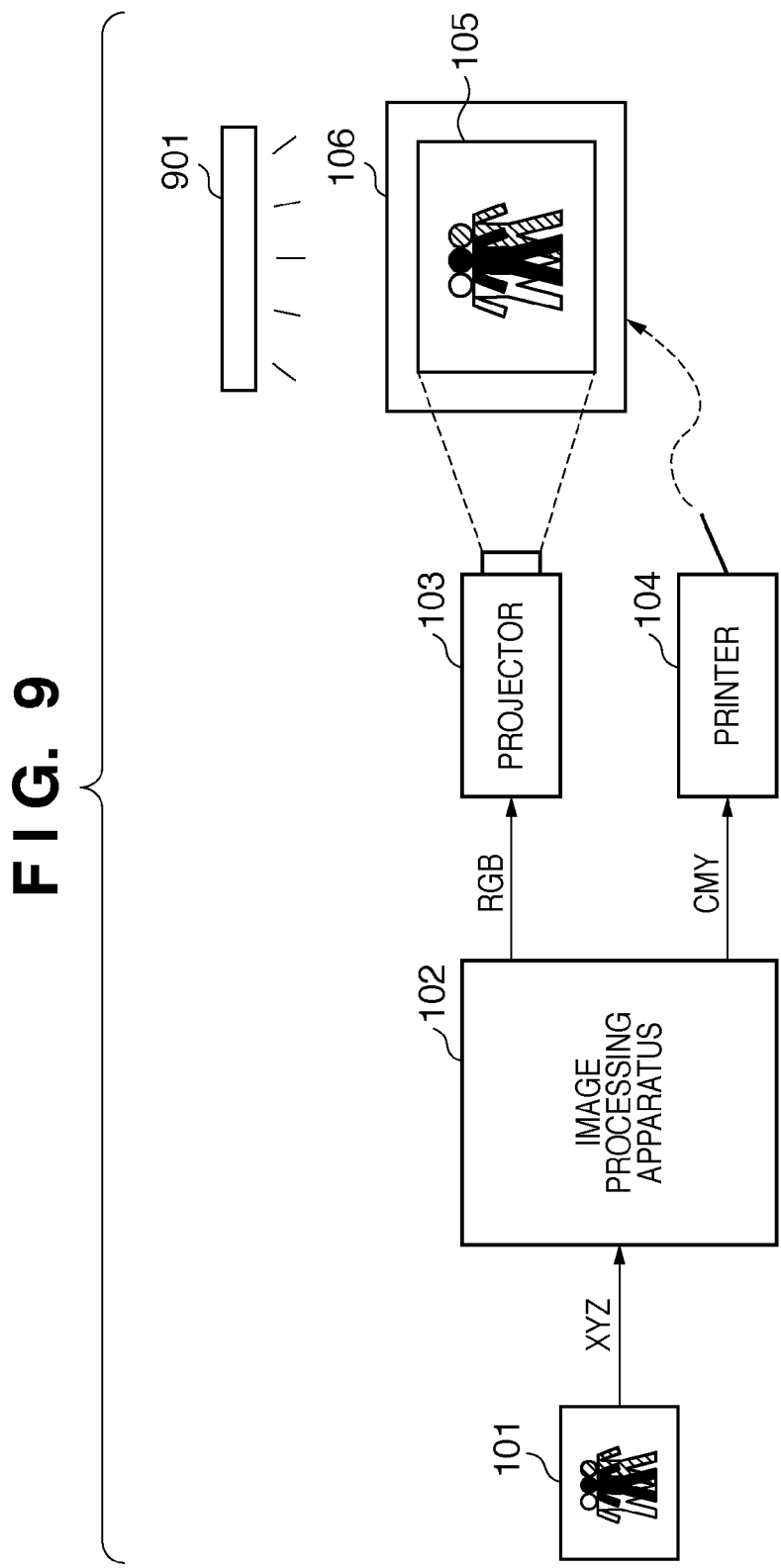
FIG. 9 is a schematic block diagram showing an example of the arrangement of an image reproduction system that considers illumination according to the second embodiment.

In the aforementioned first embodiment, illumination of an image observation environment is not particularly considered. Hence, the second embodiment will explain a method of generating the LUT 702 according to observation illumination 901 in consideration of that illumination, as shown in FIG. 9. That is, in the second embodiment, the creation method of the LUT 702 is different from the first embodiment.

Figure 10:
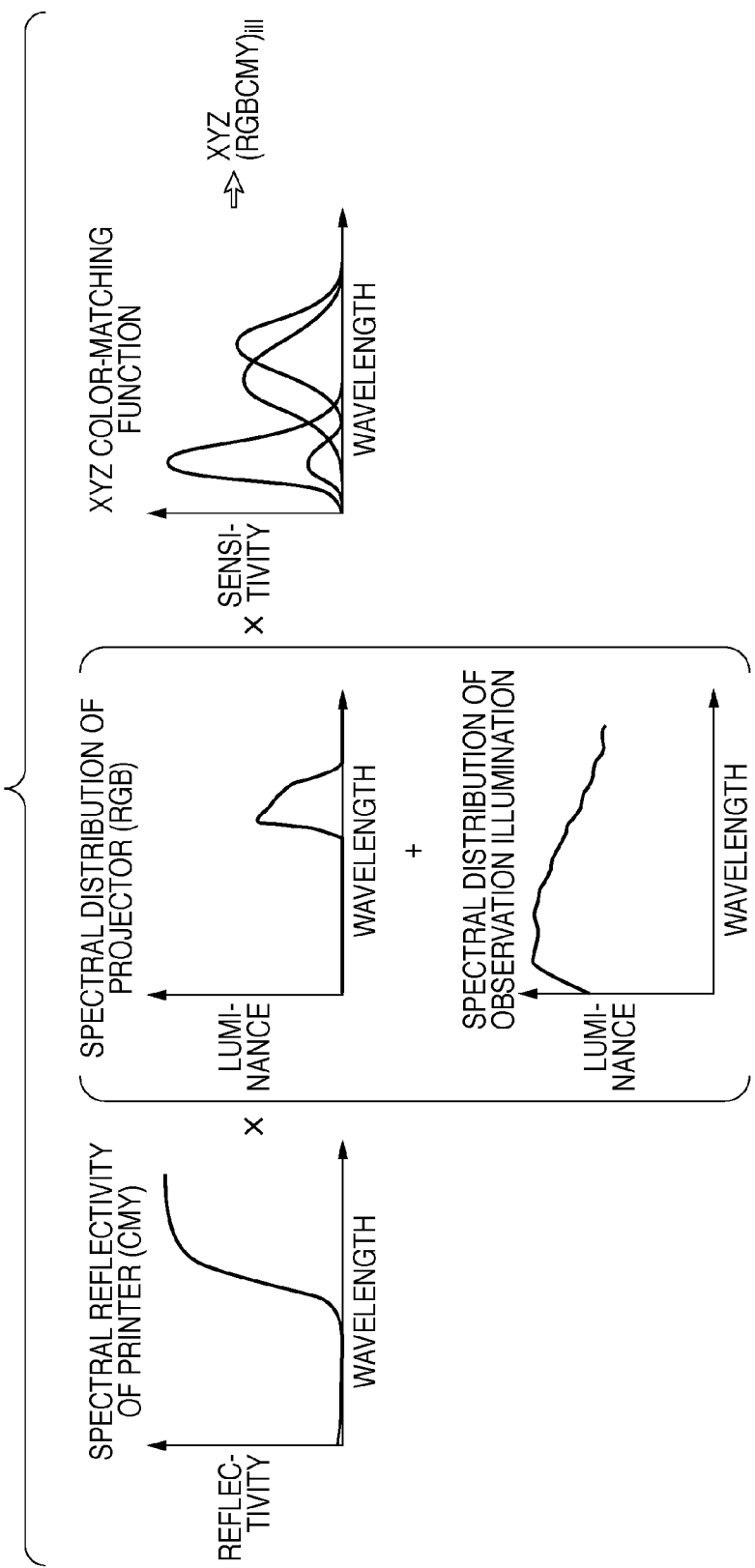
FIG. 10 is a view showing the concept of overlap color reproduction in consideration of observation illumination according to the second embodiment.

FIG. 10 shows the concept of an overlap color reproduction mechanism in consideration of illumination. According to FIG. 10, a display color $XYZ(RGBCMY)_{ill}$ upon overlapping an RGB signal of the projector and a CMY signal of the printer in consideration of illumination is calculated as follows. That is, the display color $XYZ(RGBCMY)_{ill}$ is calculated based on the spectral distribution of the projector with respect to the RGB signal, the spectral distribution of illumination, the spectral reflectivity of the printer with respect to the CMY signal, and color-matching functions.

LUT Creation Processing

Figure 11:
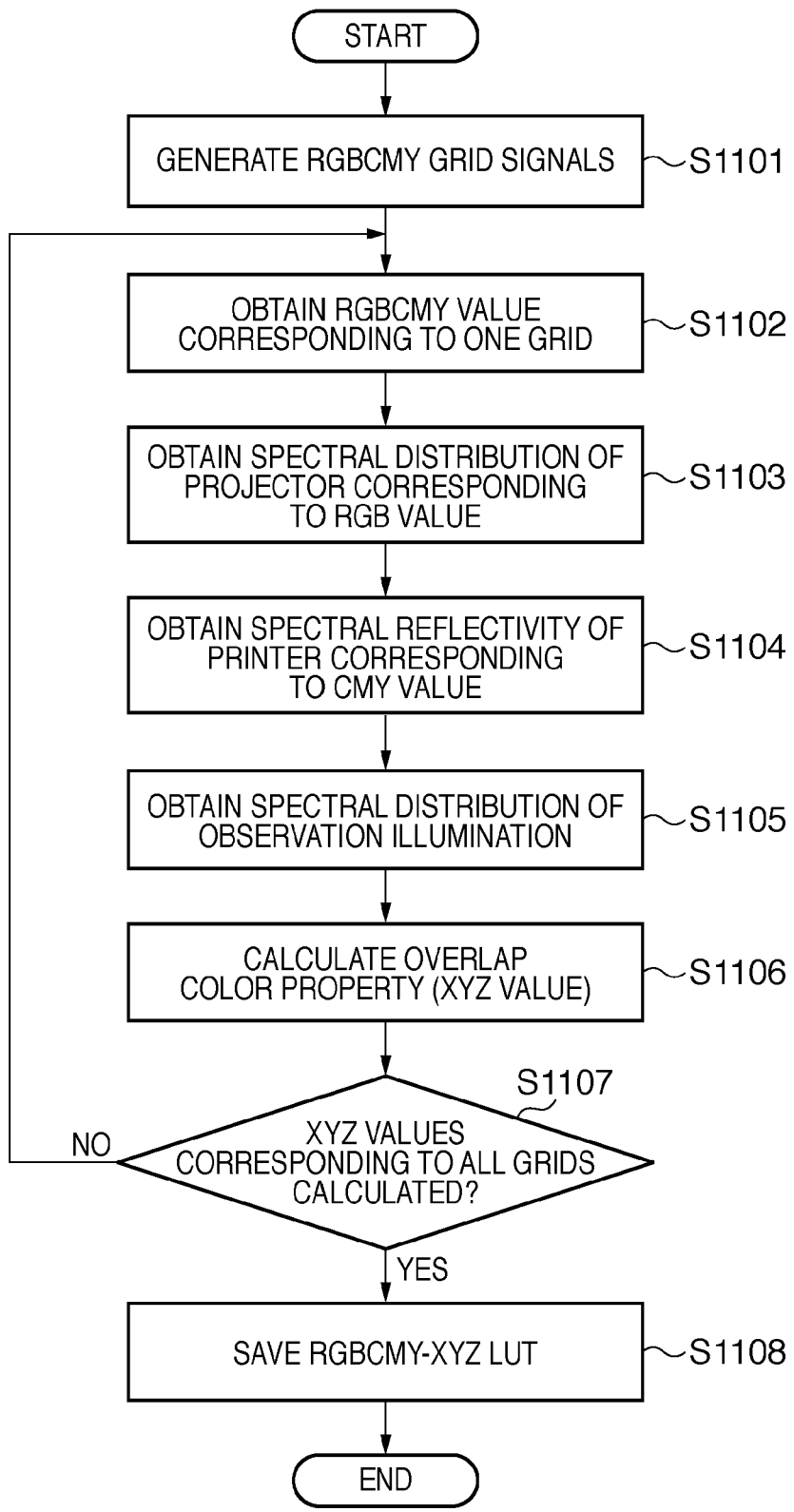
FIG. 11 is a flowchart showing the creation processing of an RGBCMY-XYZ LUT according to the second embodiment.

FIG. 11 is a flowchart showing the processing for creating the LUT 702 (shown in FIG. 7), which is referred to upon transforming an XYZ signal into RGBCMY signals, in consideration of illumination. Steps S1105 and S1106 are different from the flowchart shown in FIG. 8 in the first embodiment. That is, since steps S1101 to S1104 in FIG. 11 are the same as steps S801 to S804 in FIG. 8, and steps S1107 and S1108 are the same as steps S806 and S807, a description thereof will not be repeated.

In step S1105 of FIG. 11, the spectral distribution property of the observation illumination 901 is acquired. The spectral distribution property of illumination is obtained by measuring a perfect diffuse reflecting white plate arranged under the illumination using a measuring device such as a luminance meter, and is saved in the HD 607 as an illumination spectral distribution profile.

In step S1106, XYZ values as an overlap reproduction color obtained upon overlapping a projection color based on RGB values of interest of the projector 103 and a print color based on CMY values of interest of the printer 104 under the observation illumination 901 are calculated based on:

$$X(r,g,b,c,m,y) = \int \{S_{prj}(r,g,b,\lambda) + S_{ill}(\lambda)\} R_{prn}(c,m,y,\lambda) x(\lambda) d\lambda$$

$$Y(r,g,b,c,m,y) = \int \{S_{prj}(r,g,b,\lambda) + S_{ill}(\lambda)\} R_{prn}(c,m,y,\lambda) y(\lambda) d\lambda$$

$$Z(r,g,b,c,m,y) = \int \{S_{prj}(r,g,b,\lambda) + S_{ill}(\lambda)\} R_{prn}(c,m,y,\lambda) z(\lambda) d\lambda \quad (2)$$

where X(r, g, b, c, m, y), Y(r, g, b, c, m, y), and Z(r, g, b, c, m, y) are respectively X, Y, and Z values corresponding to arbitrary RGBCMY values. Also, $S_{prj}(r, g, b, \lambda)$ is the spectral distribution of projector projection light corresponding to arbitrary RGB values. $S_{ill}(\lambda)$ is the spectral distribution of the observation illumination, and $R_{prn}(c, m, y, \lambda)$) is the spectral reflectivity of a printed matter corresponding to arbitrary CMY values. Furthermore, $x(\lambda)$, $y(\lambda)$, and $z(\lambda)$ are XYZ color-matching functions of a 2° field, and $\lambda$ is the wavelength.

As can be seen from equations (2), the XYZ values as an overlap reproduction color are calculated based on the spectral distribution of the projector obtained in step S1103, the spectral reflectivity of the printer obtained in step S1104, and the spectral distribution property of the illumination obtained in step S1105.

In this way, according to the second embodiment, the LUT 702 under the observation illumination is created by calculating XYZ values under the observation illumination with respect to combinations of RGBCMY values.

As described above, according to the second embodiment, a table having an overlap property according to a lighting environment upon observing an image is created in advance, and is used in the color transformation processing. Therefore, since appropriate color transformation can be realized according to the observation illumination, an input color can be faithfully reproduced even under the lighting environment.

Note that in the second embodiment, XYZ values under the observation illumination may also be calculated as follows. Light corresponding to predetermined RGB values is projected onto a screen which is placed under an actual observation illumination and the spectral reflectivity of which is given, and the spectral distribution of reflected light from the screen is measured. Then, by dividing the spectral reflectivity value of the screen by the measured spectral distribution, the spectral distribution property of the projector under the observation illumination can be calculated. Then, XYZ values for combinations of RGBCMY values under the observation illumination are calculated using equations (1) described in the aforementioned first embodiment based on the obtained spectral distribution property of the projector and the spectral reflectivity of the printer.

Third Embodiment

The third embodiment according to the present invention will be described below. In the third embodiment, only a difference from the aforementioned first and second embodiments will be explained, and a redundant description will be avoided.

In the example of the aforementioned second embodiment, an overlap property table for a fixed lighting environment is created in advance, and is applied to color transformation processing. However, the third embodiment will exemplify adaptive color transformation processing in consideration of illumination when observation environment illumination is variable.

Color Transformation Processing

Figure 12:
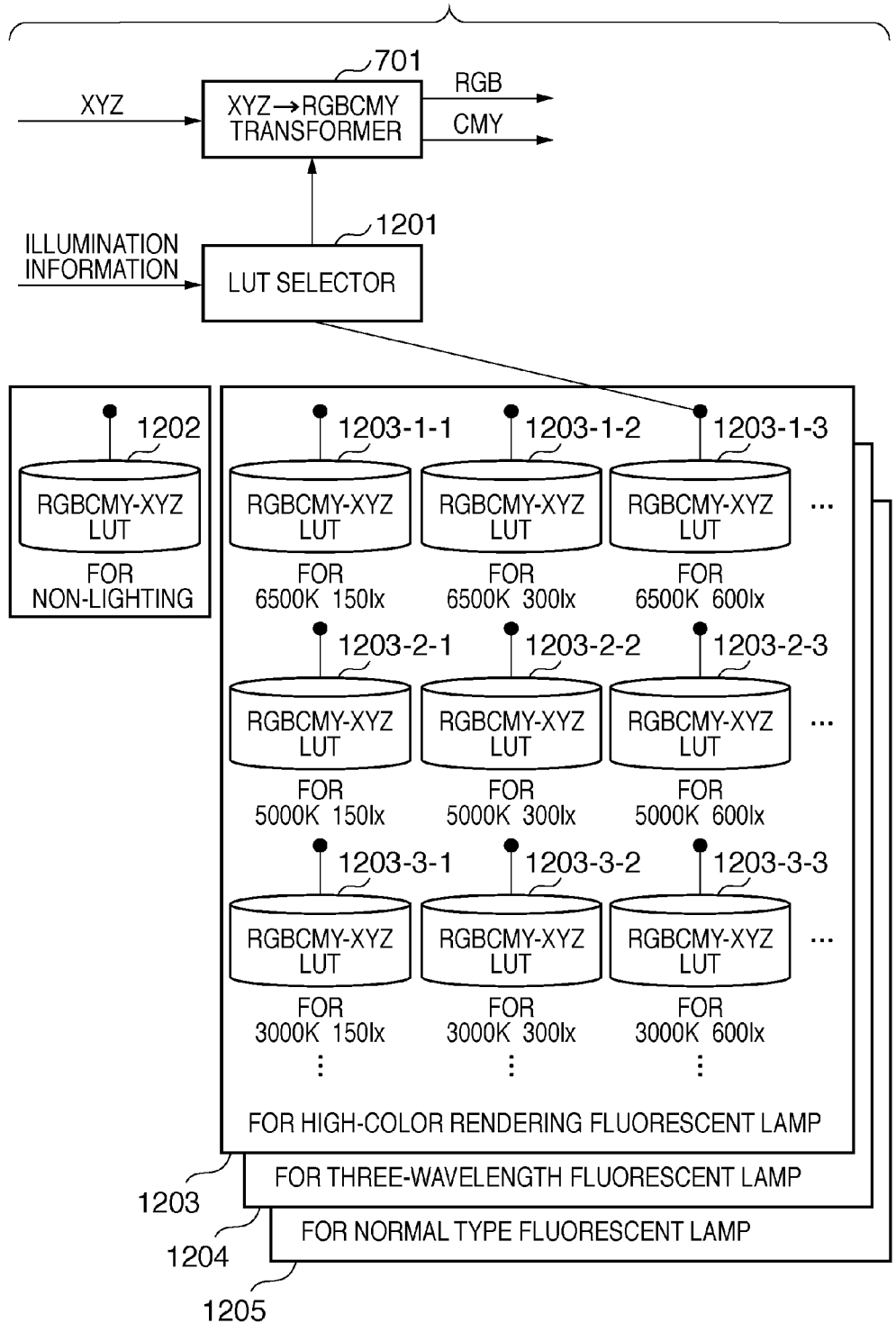
FIG. 12 is a block diagram showing an overview of color transformation processing in an image processing apparatus according to the third embodiment.

FIG. 12 is a block diagram showing an overview of color transformation processing according to the third embodiment. As shown in FIG. 12, the transformer 701 transforms an input XYZ signal into an RGB signal for the projector 103 and a CMY signal for the printer 104. At this time, the transformer 701 transforms the XYZ signal into RGBCMY signals by a known transformation method such as interpolation processing using an LUT selected by an LUT selector 1201.

The LUT selector 1201 selects an appropriate table from RGBCMY-XYZ LUTs according to a plurality of illumination conditions, which are saved in the HD 607, based on illumination information input by, for example, the user or from an illumination light measuring device.

A plurality of LUTs saved in the HD 607 are created based on illumination conditions such as illumination types, color temperatures, and illuminances. For example, in the example of FIG. 12, LUT groups 1202, 1203, 1204, and 1205 are created and stored as those according to the illumination types. More specifically, the LUT group 1202 corresponds to non-lighting, the LUT group 1203 corresponds to a high-color rendering fluorescent lamp, the LUT group 1204 corresponds to a three-wavelength fluorescent lamp, and the LUT group 1205 corresponds to a normal type fluorescent lamp.

As for the LUT groups 1203 to 1205 corresponding to the high-color rendering fluorescent lamp, three-wavelength fluorescent lamp, and normal type fluorescent lamp, a plurality of LUTs are created according to a plurality of color temperatures and illuminances: for example, 6500K, 5000K, 3000K, ... (color temperature), and 150lx, 300lx, 600lx, ... (illuminance).

Note that the illumination types, color temperatures, and illuminances in the third embodiment are not limited to those described above, and other conditions may be applied.

In the third embodiment, illumination information designated by the user or input from an illumination light measuring device includes information such as "illumination type", "color temperature", and "illuminance", and an LUT corresponding to an appropriate illumination condition is selected based on the input observation illumination information. Note that when an LUT corresponding to a condition that matches the input observation illumination information is not found, an LUT corresponding to a condition closest to the input information may be selected, or output values of a plurality of LUTs corresponding to conditions approximate to the input information may undergo interpolation processing to generate an LUT that matches the observation illumination, and the generated LUT may be used in color transformation.

Note that the LUTs corresponding to these plurality of illumination conditions can be created by executing the flowchart of FIG. 11 in the aforementioned second embodiment.

As described above, according to the third embodiment, overlap property tables corresponding to a plurality of observation illumination conditions are created and stored in advance, and a table to be used in the color transformation processing is selected according to illumination information. As a result, adaptive color transformation processing based on illumination in an actual observation environment can be executed.

Fourth Embodiment

The fourth embodiment according to the present invention will be described below. In the fourth embodiment, only a difference from the aforementioned first embodiment will be explained, and a redundant description will be avoided.

In the aforementioned first embodiment, as an overlap property LUT used in the XYZ→RGBCMY transformer 701, a six-dimensional LUT defined by six colors R, G, B, C, M, and Y as inputs is used. For this reason, the data size of the LUT becomes unwantedly huge with increasing number of grids of the LUT. Hence, the fourth embodiment is characterized by reducing the data size of the overlap property LUT used in color transformation processing.

Color Transformation Processing

Figure 13:
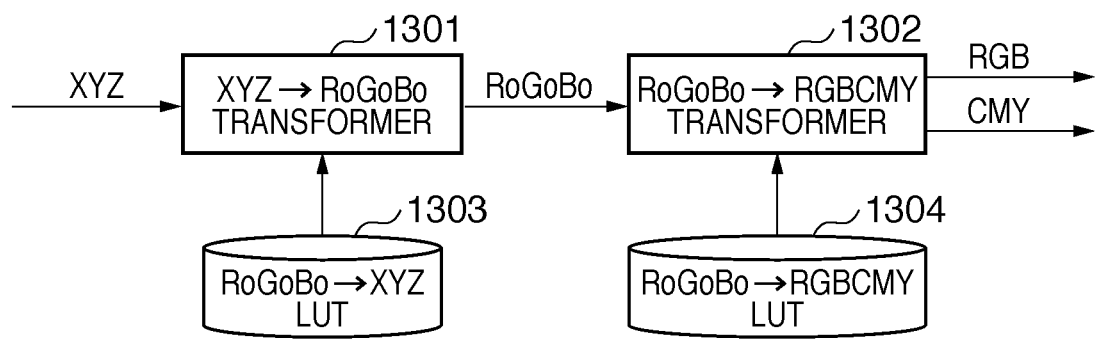
FIG. 13 is a block diagram showing an overview of color transformation processing in an image processing apparatus according to the fourth embodiment.

FIG. 13 is a block diagram showing an overview of color transformation processing according to the fourth embodiment. As shown in FIG. 13, in the color transformation processing of the fourth embodiment, color transformation is done using an XYZ→RoGoBo transformer 1301 and RoGoBo→RGBCMY transformer 1302, which will be simply referred to as transformers 1301 and 1302 hereinafter, respectively. The transformers 1301 and 1302 respectively refer to an RoGoBo→XYZ LUT 1303 and RoGoBo→RGBCMY LUT 1304, which will be simply referred to as LUTs 1303 and 1304 hereinafter, respectively.

According to FIG. 13, the transformer 1301 transforms an input XYZ signal into an RoGoBo signal as a virtual device signal upon overlapping colors of the projector 103 and printer 104. At this time, the transformer 1301 transforms the XYZ signal into the RoGoBo signal by, for example, interpolation processing using the LUT 1303 saved in the HD 607. This LUT 1303 represents, using XYZ values, an actual color reproduction property when a color signal of a virtual device upon overlapping colors of the projector 103 and printer 104 is expressed by RoGoBo, and its creation method will be described later.

The transformer 1302 then transforms the RoGoBo signal into an RGB signal for the projector 103 and a CMY signal for the printer 104. At this time, the transformer 1302 executes the same color separation processing as that executed in the creation processing of the LUT 1303 to be described later. For example, as in the LUT 1304 shown in FIG. 13, a common color separation table that attains color separation RoGoBo→RGBCMY may be used, or common color separation processing may be executed by another method.

LUT Creation Processing

Figure 14:
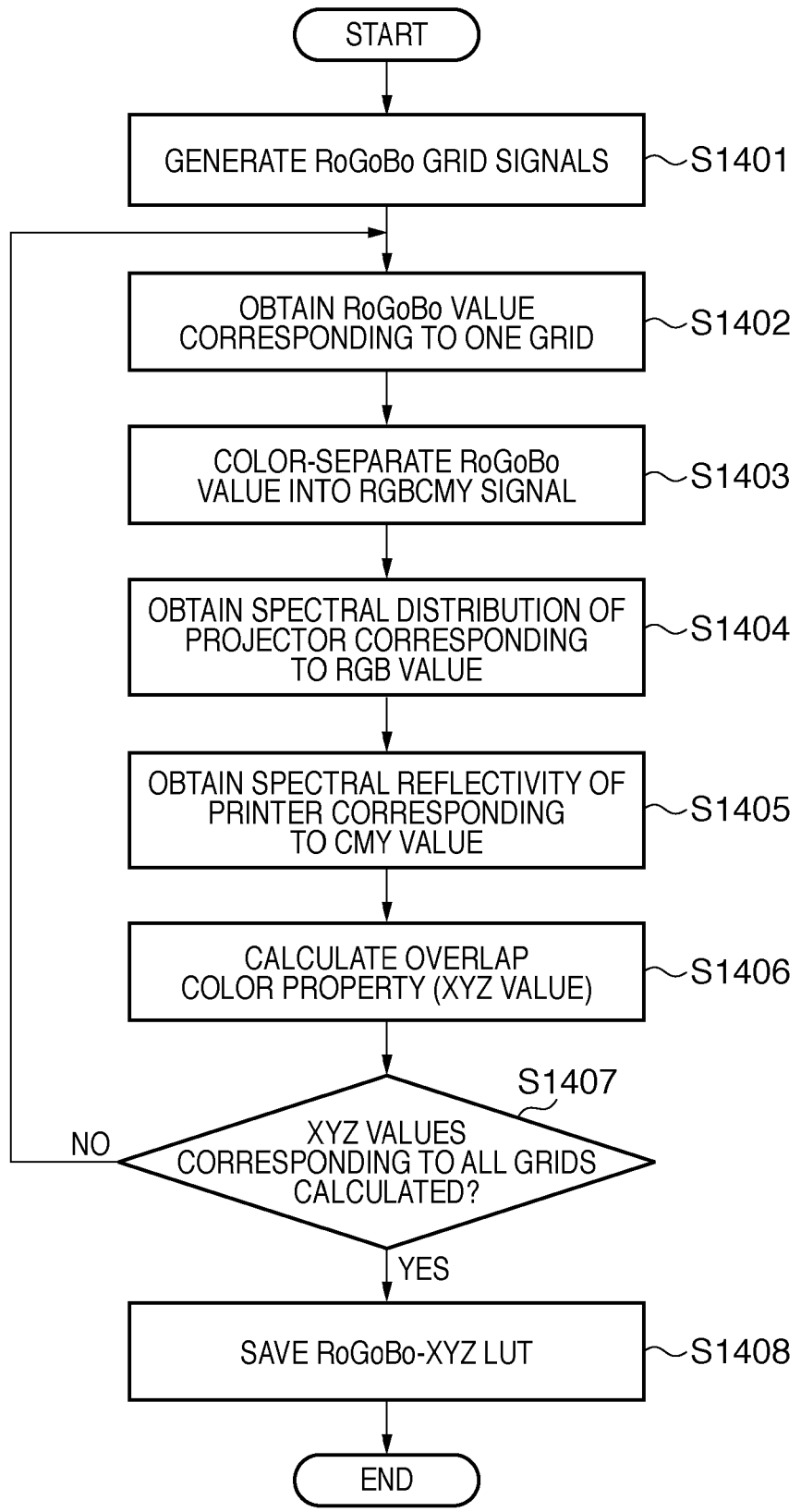
FIG. 14 is a flowchart showing the creation processing of a RoGoBo-XYZ LUT according to the fourth embodiment.

FIG. 14 is a flowchart of the creation processing of the LUT 1303, which is referred to upon transforming the XYZ signal into the RoGoBo signal in the fourth embodiment. Steps S1401 to S1403 and step S1408 are different from the flowchart shown in FIG. 8 in the first embodiment. That is, since steps S1404 to 1407 in FIG. 14 are the same as steps S803 to S806 in FIG. 8, a description thereof will not be repeated.

In step S1401, RoGoBo grid signals as virtual device signals are generated. For example, RoGoBo grid values are generated to have nine grids per color at equal intervals.

In step S1402, RoGoBo values of one color of the grid signals generated in step S1401 are obtained.

In step S1403, the RoGoBo signal values obtained in step S1402 are color-separated into RGBCMY color signal values. As this color separation, the same processing as in the RoGoBo→RGBCMY transformer 1302 shown in FIG. 13 is executed. More specifically, an LUT is prepared based on a color separation definition, which is designed in advance, and may be commonly used in the color separation in this step and the color transformation processing in the transformer 1302 or an arbitrary common definition may be set as follows. Assume that the fourth embodiment executes the color separation processing using the following common color separation definition.

$$R=Ro, G=Go, B=Bo, C=1-Ro, M=1-Go, Y=1-Bo$$

Assume that each device value is normalized to have a minimum value=0 and a maximum value=1.

After the RGBCMY signal is obtained by the aforementioned processing, XYZ values corresponding to all RoGoBo grids are calculated via the processes in steps S1404 to S1407. Finally, in step S1408 an LUT is created by associating the RoGoBo signals generated in step S1401 and the XYZ signals calculated in step S1406, and is saved as the LUT 1303 in the HD 607, thus ending the processing.

As described above, according to the fourth embodiment, since the LUT is created by replacing the overlap RGBCMY six-dimensional color space by a virtual three-dimensional space as an RoGoBo space, the data size of the LUT to be saved can be reduced compared to the aforementioned first embodiment. Then, since the LUT with higher approximation precision can be created and stored by increasing the number of grids, the color transformation precision can be improved.

In the fourth embodiment as well, an overlap property LUT that takes observation illumination into consideration may be created and may be applied to color transformation as in the second and third embodiments described above.

Fifth Embodiment

The fifth embodiment according to the present invention will be described below. In the fifth embodiment, only a difference from the first and fourth embodiments described above will be explained, and a redundant description will be avoided.

The fifth embodiment is characterized in that reproduction targets are divided depending on device types (printer/projector) and, more specifically, when one device attaches importance to color reproduction, the other device attaches importance to luminance correction. More specifically, the fifth embodiment is characterized in that the printer executes color-emphasized reproduction, while the projector executes luminance-emphasized reproduction.

More specifically, in the fifth embodiment, the following color separation definition is used in the color separation processing in the RoGoBo→RGBCMY transformer 1302 shown in FIG. 13 and that in step S1403 in FIG. 14.

$$R=W, G=W, B=W, C=1-Ro, M=1-Go, Y=1-Bo$$

Assume that each device value is normalized to have a minimum value=0 and a maximum value=1, and W=Max (Ro, Go, Bo). Using such color separation definition, the printer executes color reproduction by printing CMY signals, and the projector executes luminance reproduction by projecting only achromatic colors from white to black.

As described above, according to the fifth embodiment, since the printer executes color reproduction, and the projector executes luminance-corrected reproduction, the effect of enlarging the dynamic range of the printer can be obtained, thus improving the brightness reproducibility of printed matter.

Note that a CMYW-XYZ four-dimensional table may be used as a color transformation LUT to be referred to in the color transformation processing. In this case, after an input XYZ signal is transformed into a CMYW signal, a W signal may be transformed into a RGB signal for the projector 103.

In the fifth embodiment as well, an overlap property LUT that takes observation illumination into consideration may be created and may be applied to color transformation as in the second and third embodiments described above.

Sixth Embodiment

The sixth embodiment according to the present invention will be described below. In the sixth embodiment, only a difference from the first and fourth embodiments described above will be explained, and a redundant description will be avoided.

The sixth embodiment is characterized in that the projector executes color-emphasized reproduction, and the printer executes luminance-emphasized reproduction, contrary to the fifth embodiment.

That is, in the sixth embodiment, the following color separation definition is used in the color separation processing in the RoGoBo→RGBCMY transformer 1302 shown in FIG. 13 and that in step S1403 in FIG. 14.

$$R=Ro, G=Go, B=Bo, C=K, M=K, Y=K$$

Assume that each device value is normalized to have a minimum value=0 and a maximum value=1, and K=Min(1−Ro, 1−Go, 1−Bo). Using such color separation definition, the projector executes color reproduction by projecting RGB signals, and the printer executes luminance reproduction by printing only achromatic colors from white to black.

As described above, according to the sixth embodiment, since the projector executes color reproduction, and the printer executes luminance reproduction, the effect of enlarging the dynamic range of the projector in a darker direction can be obtained, thus eliminating black floating and improving the dark reproducibility of the projector.

Note that an RGBK-XYZ four-dimensional table may be used as a color conversion LUT to be referred to, which is used in the color transformation processing. In this case, after an input XYZ signal is transformed into an RGBK signal, a K signal may be transformed into a CMY signal for the printer 104.

In the sixth embodiment as well, an overlap property LUT that takes observation illumination into consideration may be created and may be applied to color transformation as in the second and third embodiments described above.

Seventh Embodiment

The seventh embodiment according to the present invention will be described below. In the seventh embodiment, only a difference from the first and fourth embodiments described above will be explained, and a redundant description will be avoided.

The seventh embodiment is characterized in that reproduction targets are divided to have colors of specialty color gamuts of respective devices depending on the device types (printer/projector). More specifically, the seventh embodiment is characterized in that the projector mainly reproduces colors with high brightness values (bright colors), and the printer mainly reproduces colors with low brightness values (dark colors).

That is, in the seventh embodiment, the following color separation definition is used in the color separation processing in the RoGoBo→RGBCMY transformer 1302 shown in FIG. 13 and that in step S1403 in FIG. 14.

When W≦offset, $$R=G=B=0$$

When W>offset, $$R=G=B=((W-\text{offset})/(1-\text{offset}))^\gamma$$

$$C=1-Ro, M=1-Go, Y=1-Bo$$

Assume that each device value is normalized to have a minimum value=0 and a maximum value=1, and W=Max (Ro, Go, Bo). Also, offset is a threshold, and γ is a parameter: for example, offset=0.8 and γ=3. Using such color separation definition, the projector can mainly reproduce bright colors whose brightness is higher than the threshold, and the printer can mainly reproduce dark colors whose brightness is equal to or lower than the threshold.

As described above, according to the seventh embodiment, the color transformation processing is done so that the devices respectively reproduce colors of their specialty reproduction gamuts. Then, the projector reproduces a glossy area (specular reflection area) of, for example, a glossy CG image, and the printer reproduces the remaining area (diffusion reflection area), thus reproducing an image with a wide dynamic range.

In the seventh embodiment as well, an overlap property LUT that takes observation illumination into consideration may be created and may be applied to color transformation as in the second and third embodiments described above.

Eighth Embodiment

The eighth embodiment according to the present invention will be described below. In the eighth embodiment, only a difference from the first and fourth embodiments described above will be explained, and a redundant description will be avoided.

The eighth embodiment is characterized in that a reproduction method is switched for each object in an image.

Color Transformation Processing

Figure 15:
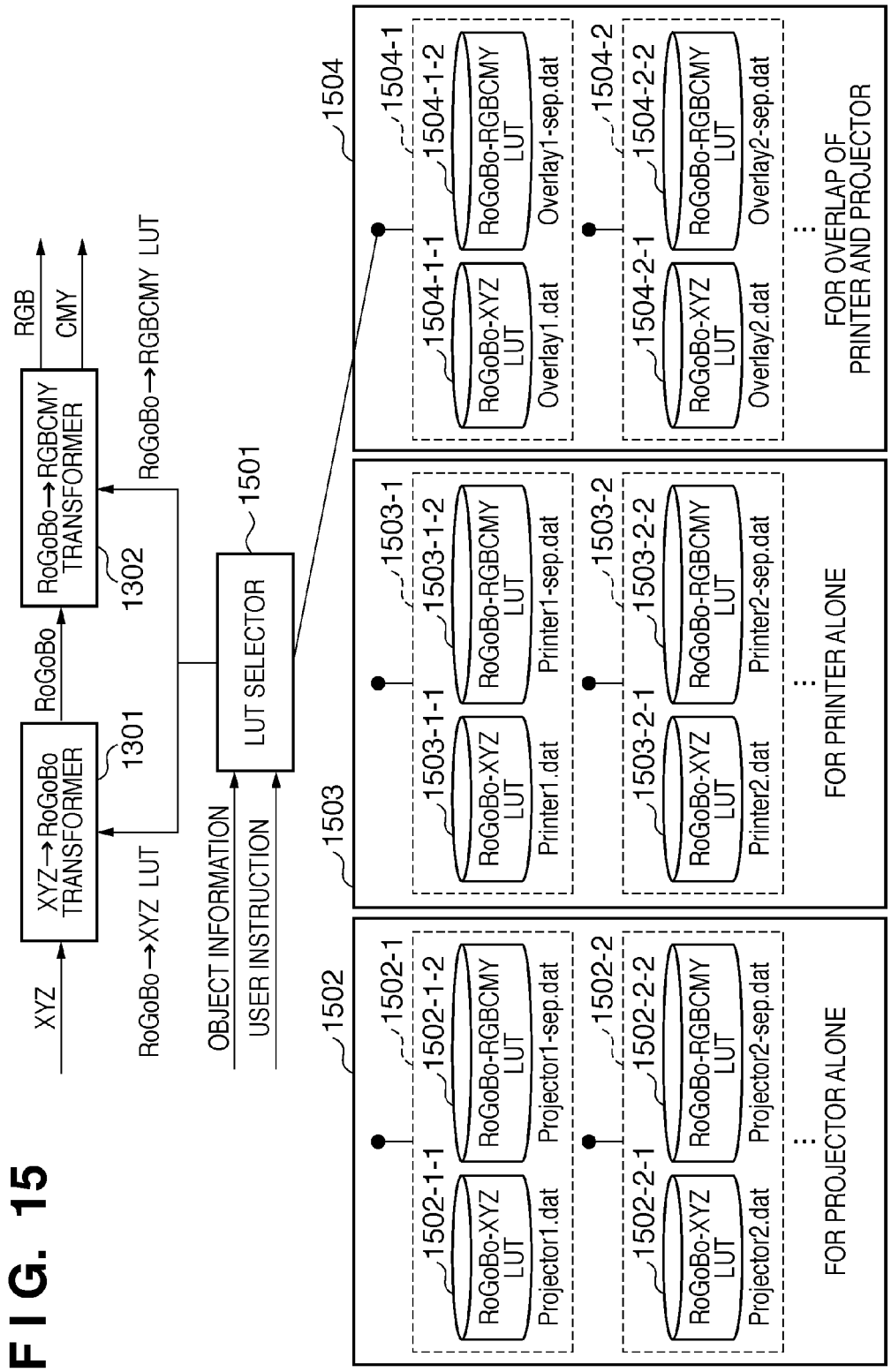
FIG. 15 is a block diagram showing an overview of color transformation processing in an image processing apparatus according to the eighth embodiment.

FIG. 15 is a block diagram showing an overview of color transformation processing according to the eighth embodiment. As shown in FIG. 15, in the eighth embodiment, color transformation is done by the XYZ→RoGoBo transformer 1301 and RoGoBo→RGBCMY transformer 1302 as in the color transformation processing shown in FIG. 13 in the fourth embodiment described above. The eighth embodiment is characterized in that an LUT selector 1501 selects an RoGoBo-XYZ LUT and RoGoBo-RGBCMY LUT to be referred to at that time based on object information and a user instruction.

The LUT selector 1501 selects an appropriate LUT from a plurality of LUTs saved in the HD 607 based on object information associated with an input XYZ signal and user instruction information. In this embodiment, for example, assume that the types of objects of three types, that is, image, graphics, and text are given as the object information.

The plurality of LUTs saved in the HD 607 are created depending on device combinations, that is, for respective use modes. For example, an LUT group 1502 for a projector alone, an LUT group 1503 for a printer alone, and an LUT group 1504 for overlap of the printer and projector are created and stored in the example of FIG. 15.

RoGoBo-XYZ LUTs 1504-1-1, 1504-2-1, ... in the LUT group 1504 for overlap of the printer and projector shown in FIG. 15 are created to respectively have different properties. For example, assume that these LUTs are created by the creation methods described in the fourth to seventh embodiments described above. Also, in the LUT group 1504, the LUTs 1504-1-1, 1504-2-1, ... are associated with RoGoBo-RGBCMY LUTs 1504-1-2, 1504-2-2, ... which are the same as those used upon creating the former LUTs, as pairs. Note that the color separations defined by the RoGoBo-RGBCMY LUTs 1504-1-2, 1504-2-2, ... are not limited to those described in the fourth to seventh embodiments described above, and these LUTs may be created based on arbitrary color separation definitions.

However, as for RoGoBo-RGBCMY LUTs 1502-1-2, 1502-2-2, ... in the LUT group 1502 for the projector alone and the LUT group 1503 for the printer alone, their color separation definitions have the following restrictions.

In each RoGoBo-RGBCMY LUT for the projector alone, C=M=Y=0 is always set. Then, since the printer skips printing for an object area to which that LUT is applied, color reproduction by the projector alone is made.

Next, in each RoGoBo-RGBCMY LUT for the printer alone, R=G=B=0 is always set. Then, since the projector projects slight projection light for an object area to which that LUT is applied, color reproduction nearly equal to the printer alone is made.

In the eighth embodiment, since the LUTs are switched for respective objects in an image, the color reproduction methods for respective objects can be switched.

User Interface

In the eighth embodiment, the LUT selector 1501 selects an LUT according to object information, as described above. In this case, the user gives detailed rules of selection.

Figure 16:
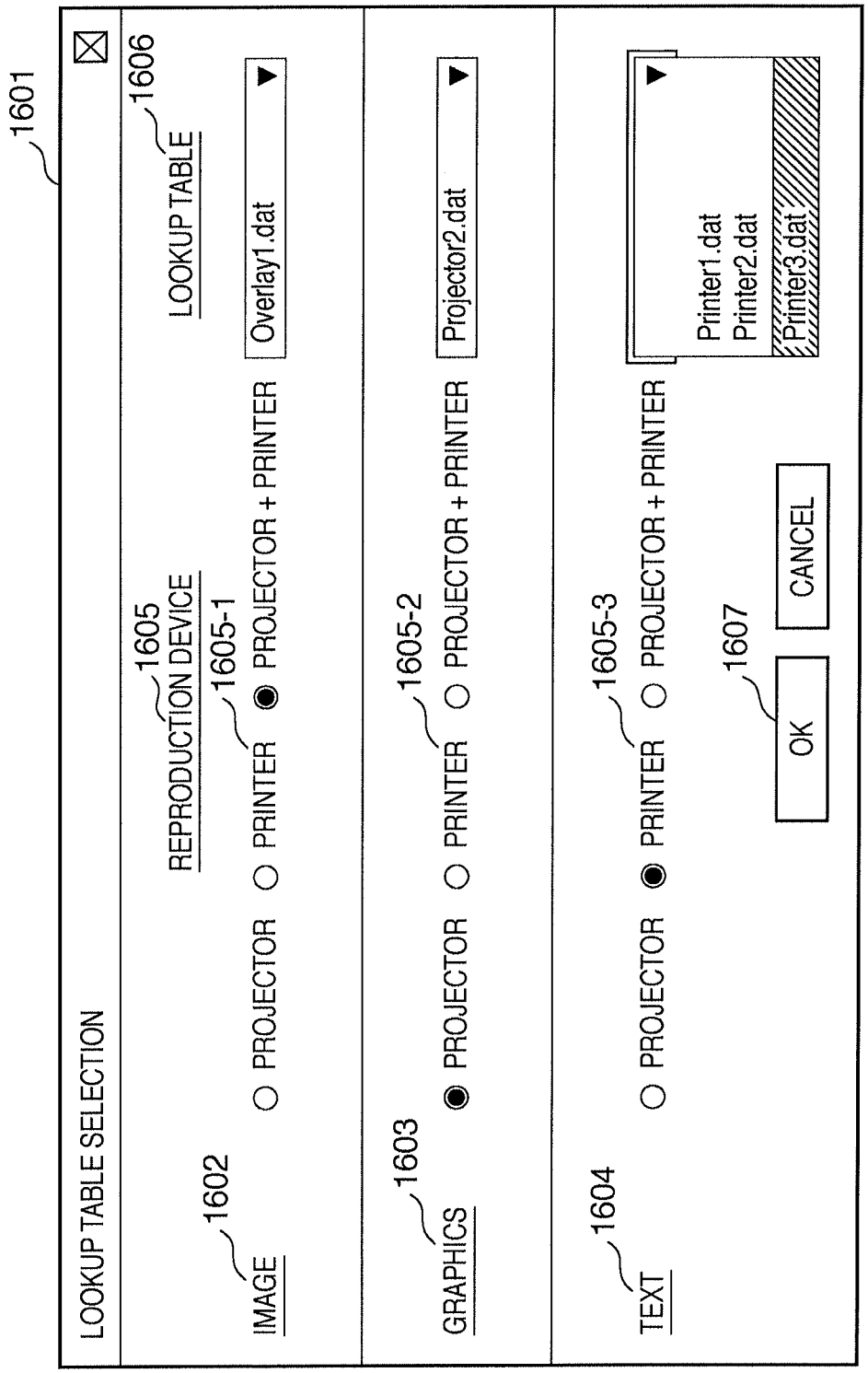
FIG. 16 is a view showing an example of a user interface used to select an LUT according to the eighth embodiment.

FIG. 16 shows an example of a user interface (to be abbreviated as UI hereinafter) used to input a user instruction that gives rules to the LUT selector 1501.

Reference numeral 1601 denotes an example of a UI screen used to decide LUTs. Object types are classified into three types, that is, "image" 1602, "graphics" 1603, and "text" 1604. For each object type, the user selects "reproduction device" 1605 indicating a device combination used in reproduction, and "lookup table (LUT)" 1606 used in that case.

As the "reproduction device" 1605 for each object type, the user selects one of "projector alone", "printer alone", and "overlap of projector and printer" using a corresponding check box. According to the selection result, an LUT group to be displayed on a pull-down menu of the "LUT" 1606 is changed, and the user selects a desired LUT from the pull-down menu. Note that the LUTs selectably displayed on the pull-down menu of the "LUT" 1606 are the RoGoBo-XYZ LUTs (LUT 1502-1-1, etc.), and when one of these LUTs is selected, the RoGoBo-RGBCMY LUT (LUT 1502-1-2, etc.), which is associated with the selected LUT, is automatically selected.

Finally, when the user clicks an OK button 1607, LUTs used at the time of color transformation are decided for respective objects.

In this way, according to the eighth embodiment, for example, the user can select, for a text object, reproduction using a printer or projector alone, so as to present, for example, character bleeding due to misregistration upon overlapping the outputs of the projector and printer. For other objects, the user can set to apply color reproduction by overlapping the outputs of the projector and printer, so as to receive the benefit of the enlarged dynamic range and color gamut by overlapping the outputs of the projector and printer.

In the eighth embodiment, using pairs of LUTs, which are regulated, as described above, the XYZ→RoGoBo transformer 1301 and RoGoBo→RGBCMY transformer 1302 shown in FIG. 15 execute color transformation according to objects.

As described above, according to the eighth embodiment, since the color transformation is executed while switching the reproduction device and overlap property for each object, optimal color transformation processing can be executed for each object.

Note that in the eighth embodiment as well, an overlap property LUT that takes observation illumination into consideration may be created and may be applied to color transformation as in the second and third embodiments described above.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-274870, filed Oct. 24, 2008, which is hereby incorporated by reference herein in its entirety.

What is claimed is:

1. An image processing method for reproducing one image by overlapping output images by first and second devices having different output modes, comprising:
    an input step of inputting an image signal to be reproduced;
    an image signal generation step of generating, from the input image signal, a first image signal for the first device and a second image signal for the second device; and
    an output step of outputting the first image signal to the first device and the second image signal to the second device, and
    wherein in the image signal generation step, the first and second image signals are generated based on a color reproduction property of an overlap color upon overlapping outputs generated by the first and second devices using a color reproduction property associated with the first device and a color reproduction property associated with the second device.

2. The method according to claim 1, wherein the color reproduction property associated with the first device is a spectral distribution characteristics associated with the first device and the color production property associated with the second device is a spectral reflectivity characteristics associated with the second device in the device.

3. The method according to claim 2, wherein the color reproduction property of the overlap color is a spectroscopic characteristics obtained by multiplication of the spectral distribution characteristics, the spectral reflectivity characteristics, and a color-matching function.

4. The method according to claim 3, wherein in the image signal generation step, the first and second image signals are generated based on the spectroscopic characteristics and a spectral characteristics of a projection light for the overlap color.

5. The method according to claim 4, further comprising a storage step of storing a transformation table created based on the spectroscopic characteristics and a spectroscopic characteristics of a projection light for the overlap color, and
    wherein in the image signal generation step, the image signal input in the input step is transformed into the first and second image signals using the table stored in the storage step.

6. The method according to claim 5, wherein in the storage step, a plurality of tables, which are respectively created according to different observation illuminations, are stored,
    the method further comprises a table selection step of selecting an appropriate table from the storage step according to information of an actual observation illumination, and
    in the image signal generation step, the image signal input in the input step is transformed into the first and second image signals using the table selected in the table selection step.

7. The method according to claim 5, wherein in the storage step, a plurality of tables respectively having different properties are stored in correspondence with sole use modes and an overlap use mode of the first and second devices,
    the method further comprises a table selection step of selecting an appropriate table from the storage step in accordance with a use mode of the first and second devices for each type of an object in an image, and
    in the image signal generation step, the image signal input in the input step is transformed into the first and second image signals using the table selected in the table selection step.

8. The method according to claim 7, wherein in the table selection step, the use mode of the first and second devices and the table according to the use mode are selected for each type of an object in an image based on a user instruction.

9. The method according to claim 1, further comprising:
    a storage step of storing a transformation table, which is created based on the color reproduction property of the overlap color,
    wherein in the image signal generation step, the image signal input in the input step is transformed into the first and second image signals using the table stored in the storage step.

10. The method according to claim 9, wherein the table is created using a virtual three-dimensional color space upon overlapping output images by the first and second devices.

11. The method according to claim 10, wherein the table is created so that one of the first device and the second device attaches importance to color reproduction, and the other attaches importance to luminance correction.

12. The method according to claim 10, wherein the table is created so that the first device reproduces colors whose brightness is higher than a predetermined threshold, and the second device reproduces colors whose brightness is not more than the threshold.

13. The method according to claim 1, wherein the first device is a projector, and
    the second device is a printer.

14. A non-transitory computer-readable storage medium storing a program for making a computer function as respective steps of an image processing method according to claim 1.

15. An image processing method for generating images respectively for first and second devices so as to reproduce one image by overlapping output images by the first and second devices having different output modes, comprising:
- an input step of inputting an image signal to be reproduced; and
- an image signal generation step of generating, from the input image signal, a first image signal for the first device and a second image signal for the second device,
- wherein in the image signal generation step, the first and second image signals are generated based on a spectroscopic characteristics associated with the first device and a spectroscopic characteristics associated with the second device, and
- wherein in the image signal generation step, the first and second image signals are generated based on a color reproduction property of an overlap color upon overlapping outputs generated by the first and second devices using a color reproduction property associated with the first device and a color reproduction property associated with the second device.

16. The method according to claim 15, further comprising a step of creating a transformation table based on the color reproduction property of the overlap color,
- wherein in the image signal generation step, the image signal input in the input step is transformed into the first and second image signals using the table.

* * * * *